Patented Aug. 18, 1931

1,819,356

UNITED STATES PATENT OFFICE

JOHN W. CHURCH, OF CARNEGIE, PENNSYLVANIA

METHOD OF MAKING PRECIPITATED SILICA

No Drawing.  Application filed September 27, 1928.  Serial No. 308,882.

This invention relates generally to precipitated silica particularly adapted for use in a rubber mixture, and to the process of producing the same. It relates more particularly to precipitated silica in substantially its dehydrated condition.

Heretofore it has been proposed to use silica gel as a reinforcing pigment in rubber mixtures. Silica gel contains a substantial amount of water which interferes with the successful curing of the articles produced from the rubber mixture. During the curing operation, the water contained in the mixture is vaporized and sometimes results in articles having a porous nature, and also in prevulcanizing the mixture.

My invention provides precipitated silica which when added to a rubber mixture and the mixture is cured the articles resulting therefrom are substantially nonporous. This is due to the fact that the precipitated silica produced in accordance with my process contains less than five per cent of water.

In practicing my invention, I preferably produce precipitated silica having the characteristic above mentioned, in the following manner. An alkali silicate such as sodium silicate of about 40° Bé. is diluted with about eight times its weight of water. An acid such as hydrochloric, sulphuric, nitric or acetic, is added to the aqueous solution of alkali silicate in such quantity as to neutralize the alkali. By this addition of an acid, silica gel is produced. The silica gel is allowed to remain undisturbed for a time sufficient to allow thorough diffusion of the acid. This usually takes about twenty-four hours. The gel is then dehydrated in order to change the silica gel from its jelly-like form to a congealed mass which can be easily ground and washed. The temperature which I prefer to employ in this dehydrating step is about 300° C. The temperature may, however, be varied within fairly wide limits, provided the time of dehydration is varied accordingly, as the object of this step is to flocculate the precipitated silica so that it can be easily and thoroughly ground and washed to remove impurities. The dehydration is carried on until the gel will no longer revert to its former gelatinous colloidal form in the presence of water.

The cake resulting from the dehydrating step is then ground wet in a tube mill or Burr mill, preferably using water as the liquid. This breaks up the mass into fine particles, and the water used in grinding dissolves the impurities so they can be easily removed in the next washing step. The slurry or wet mass resulting from wet grinding is then transferred to a decanting tank and allowed to settle. I prefer to settle the material for about twenty-four hours. The supernatant liquid is then drawn off from the decanting tank, the material which has settled is again washed and the supernatant liquid is again decanted. The washing and decantation steps are repeated until the salt contained is less than one-half of one per cent on a dry basis. The salt referred to is sodium chloride if the silica gel was produced by the addition of hydrochloric acid to the alkali silicate. If sulphuric acid were added to the alkali silicate, the resultant salt would be sodium sulphate.

The washed, precipitated silica is then subjected to a second dehydration. The temperature at which the second dehydration is carried out greatly influences the character of the product, and also influences the characteristics of rubber articles made from mixes containing the product. The second dehydration is carried out at a temperature of not less than about 200° C. until the silica contains not over 5 percent of water. If a lower temperature is employed, it is practically impossible to obtain precipitated silica having less than five per cent of water. The upper temperature at which the second dehydrating step may be carried out varies in accordance with the time during which the precipitated silica is heated. I prefer to employ a temperature of about 300 to 325° C., and I have found that a temperature of about 315° C. results in precipitated silica which has an oil adsorption value approximately the same as that of a carbon black which is greatly desired because of its reinforcing effect in rubber. This temperature produces a pigment which gives increased tensile strength and elongation to rubber containing it.

The cake resulting from the second dehydration is then disintegrated and may thereafter be mixed with rubber and other materials such as sulphur, and if desired, with an accelerator.

Precipitated silica made according to my invention has a linseed oil adsorption value, according to the Gardner method, of between 150 and 250. The Gardner method of determining the linseed oil number is briefly as follows. One hundred grams of the material in powdered form is placed in a beaker and linseed oil is introduced from a titrating burette while stirring. The number of cubic centimeters of oil required to change the material from its powdered state to a homogeneous mass is the linseed oil adsorption value.

Rubber articles produced from a mixture containing precipitated silica made in accordance with my invention have greater elongation, greater tensile strength, and greater resistance to abrasion than rubber made from mixes employing the usual reinforcing pigments.

I have described in detail the present preferred method of carrying out my invention and have stated the present preferred temperatures which I employ. It is to be understood, however, that the invention may be otherwise modified without departing from the spirit of the invention or the scope of the following claims.

I claim:

1. The process of making precipitated silica, which comprises dehydrating a colloidal solution of silica gel until it will no longer revert to its former gelatinous colloidal form in the presence of water, wet grinding the dehydrated product, washing, and subjecting the washed product to a second dehydration.

2. The process of making precipitated silica, which comprises dehydrating a colloidal solution of silica gel until it will no longer revert to its former gelatinous colloidal form in the presence of water, wet grinding the dehydrated product, washing, and subjecting the washed product to a second dehydration at a temperature of not less than about 200° C.

3. The process of making precipitated silica, which comprises dehydrating a colloidal solution of silica gel until it will no longer revert to its former gelatinous colloidal form in the presence of water, wet grinding the dehydrated product, washing, and subjecting the washed product to a second dehydration for a time sufficient to produce precipitated silica containing less than five per cent water.

4. The process of making precipitated silica, which comprises dehydrating a colloidal solution of silica gel until it will no longer revert to its former gelatinous colloidal form in the presence of water, wet grinding the dehydrated product, washing, and subjecting the washed product to a second dehydration at a temperature of from 300 to 325° C.

5. The process of making precipitated silica, which comprises dehydrating a colloidal solution of silica gel at a temperature of about 300° C. until it will no longer revert to its former gelatinous colloidal form in the presence of water, wet grinding the dehydrated product, washing, and subjecting the washed product to a second dehydration at a temperature of not less than about 200° C.

6. The process of making precipitated silica, which comprises forming an aqueous solution of alkali silicate, mixing an acid therewith to form silica gel, dehydrating the gel at about 300° C. until it will no longer revert to its former gelatinous colloidal form in the presence of water, wet grinding the dehydrated product, washing the ground material until it contains less than one-half of one per cent salt, and subjecting the washed product to a temperature of not less than 200° C.

7. The process of making precipitated silica, which comprises forming an aqueous solution of alkali silicate, mixing an acid therewith to form silica gel, dehydrating the gel at about 300° C. until it will no longer revert to its former gelatinous colloidal form in the presence of water, wet grinding the dehydrated product, washing the ground material until it contains less than one-half of one per cent salt, and subjecting the washed product to a temperature of about 315° C.

In testimony whereof I have hereunto set my hand.

JOHN W. CHURCH.